United States Patent [19]
Daase et al.

[11] Patent Number: 5,923,652
[45] Date of Patent: Jul. 13, 1999

[54] METHOD FOR TYING ADDITIONAL FUNCTION MODULES INTO A CONTROLLING FACILITY OF A SWITCHING SYSTEM, AND A SWITCHING SYSTEM

[75] Inventors: Detlef Daase, Berlin; Karl-Heinz Legat, Renningen; Irina Müller, Berlin, all of Germany

[73] Assignee: Alcatel Alsthom Compagnie Generale d'Electricite, Paris, France

[21] Appl. No.: 08/767,727

[22] Filed: Dec. 16, 1996

[30] Foreign Application Priority Data

Dec. 16, 1995 [DE] Germany ................ 19547108

[51] Int. Cl.⁶ ........................................ H04J 3/12
[52] U.S. Cl. ................ 370/360; 370/386; 370/401
[58] Field of Search ............................. 370/360, 386, 370/401, 402, 407, 422, 425, 58; 395/200 T, 275, 186, 188, 600, 650, 602; 364/514

[56] References Cited

U.S. PATENT DOCUMENTS

| | | | |
|---|---|---|---|
| 4,979,164 | 12/1990 | Ardon | 370/58 |
| 5,257,366 | 10/1993 | Adair et al. | 395/600 |
| 5,404,396 | 4/1995 | Brennan | 379/201 |
| 5,423,034 | 6/1995 | Cohen-Levy et al. | 395/600 |
| 5,475,817 | 12/1995 | Waldo et al. | 395/650 |
| 5,677,851 | 10/1997 | Kingdon et al. | 364/514 |
| 5,696,898 | 12/1997 | Baker et al. | 395/187.01 |
| 5,752,018 | 5/1998 | Sheffield | 395/602 |
| 5,761,199 | 6/1998 | Kiel et al. | 370/360 |

FOREIGN PATENT DOCUMENTS

| | | |
|---|---|---|
| 0303869 | 2/1989 | European Pat. Off. . |
| 0578964 | 1/1994 | European Pat. Off. . |
| 3727942 | 3/1989 | Germany . |
| 3727952 | 3/1989 | Germany . |
| 4430876 | 7/1995 | Germany . |

OTHER PUBLICATIONS

"Hardware und software des Dienstevermittlungssystems PAsst", J. Freidrichs et al, *PKI Tech. Mitt.*, Feb. 1989, pp. 1 5–23.

"System HICOM 600", Siemens Productschrift, Bereich Privat—und Sonder–Kommunikationsnetze, Munchen, Dec. 1984, pp. 52–53.

*Primary Examiner*—Chau Nguyen
*Assistant Examiner*—Phuongchau Ba Nguyen
*Attorney, Agent, or Firm*—Ware, Fressola, Van Der Sluys & Adophson LLP

[57] ABSTRACT

The invention relates to a method for tying additional function modules into a control facility of a switching system and to a switching system. A switching system comprises a control facility (CONTR) provided with a plurality of basic function modules (APP1 to APP3, BP1 to BP4) which are mutually coupled to each other, for controlling the switching functions of the switching system. The basic function modules (APP1 to APP3, BP1 to BP4) are coupled to one or more access modules (ACC). The additional function modules (APP11 to APP23, KONVERT1, KONVERT2) access the basic function modules (APP1 to APP3, BP1 to BP4) only via the access modules (ACC), such that at any given time each of the access modules (ACC), depending on the accessing additional function module (APP11 to APP23, KONVERT1 , KONVERT2), provides the additional function modules (APP11 to APP23, KONVERT1, KONVERT2) with only one individual logical access interface (INT1 to INT4) to the basic function modules (APP1 to APP3, BP1 to BP4).

10 Claims, 3 Drawing Sheets

METHOD FOR TYING ADDITIONAL FUNCTION MODULES INTO A CONTROLLING FACILITY OF A SWITCHING SYSTEM, AND A SWITCHING SYSTEM

BACKGROUND OF THE INVENTION

1. Field of the Invention

The invention relates to a method for tying additional function modules into a control facility of a switching system and to a switching system.

2. Description of the Related Art

The invention is based on the known principle governing the design of the control for a switching system. A good representation of such a design can, for example, be found in the article "Hardware and software of the service switching system PAsst" published in the journal PKI Technische Mitteilungen, 2/1989, pages 15–23, by Joachim Friedrichs et al.

This switching system includes a central processor which in, conjunction with peripheral processors, executes all check, management and control functions and constitutes the hardware platform for the software of the switching system.

The software of the switching system is based on a real time operating system and controls the entire routing flows, manages the system and checks the availability of all control components. In order to facilitate changes and updates in the software, the software is partitioned into function modules, also called building blocks, which constitute the constructive basic unit. Such a function module comprises programs and data and provides services to and accepts services from other function modules via a defined interface. The entire software is structured in form of several layers, each layer comprising one or more function modules. The layers are arranged in such a way that each function module can only use the services of the layers underneath. Hereby, the relationships between function modules are, in addition, systematically structured, thereby further simplifying changes in the software.

Although this principle for software architecture simplifies tying new function modules and changing existing function modules, such changes still carry the risk of malfunctioning and require a detailed understanding of the entire switching system.

SUMMARY OF THE INVENTION

It is the object of the invention to improve the tying of additional function modules into a control facility of a switching system.

According to a first aspect of the invention, a method of tying additional function modules into a control facility of a switching system, said control facility comprising a plurality of coupled basic function modules for controlling switching functions of the switching system, is characterized in that basic function modules are coupled with one or more access modules, that the additional function modules access basic function modules via the access modules only, and that depending on the respective additional function module accessing basic function modules, the access modules make available to the additional function module a respective logic access interface to basic function modules.

According to a second aspect of the invention, a switching system with a control facility comprising a plurality of coupled basic function modules for controlling switching functions of the switching system is characterized in that the control facility further comprises additional function modules and one or more access modules, that the access modules are coupled with basic function modules, that the control facility is so designed that the additional function modules access the basic function modules via the access modules only, and that depending on the respective additional function module accessing basic function modules, the access modules are designed to make available to the additional function module a respective logic access interface to basic function modules.

The basic idea of the invention is that the additional function modules do no longer have access to all function modules of the switching system, but may only access the function modules via access modules, and that these additional modules provide each of the access function modules with an individual logical access interface to the function modules. In this way, the access by the additional function modules to the function modules can be restricted on an individual basis and an individual representation of the data of the function modules can be created for the additional modules.

Preferred embodiments of the invention can be found in the dependent claims.

The invention has the advantage that additional function modules developed by third parties can now be advantageously tied to the control of a switching system:

The access options of these additional function modules are restricted by the access modules to the extent required by the respective function, such that the switching system, in particular secure sections of the switching system, cannot be accessed unless authorization therefor has been granted.

It is another advantage that internal structures do not have to be exposed in order to tie additional function modules. The desired access options can be provided in the desired form. Consequently, internal structures remain hidden and these internal structures can still be changed without affecting the additional function modules.

It is a further advantage of the invention that a separate logical interface can be provided for each additional function module wherein the logical interface has to understand only the software of the switching system specific to the functions of the additional function module. These and other objects, features and advantages of the present invention will become more apparent in light of the detailed description of a best mode embodiment thereof, as illustrated in the accompanying drawing.

DESCRIPTION OF THE PREFERRED EMBODIMENT

In the embodiment, there is described the implementation of the method according to the invention for tying additional function modules into a control facility of a switching system in a switching system of the invention.

Figure 1:
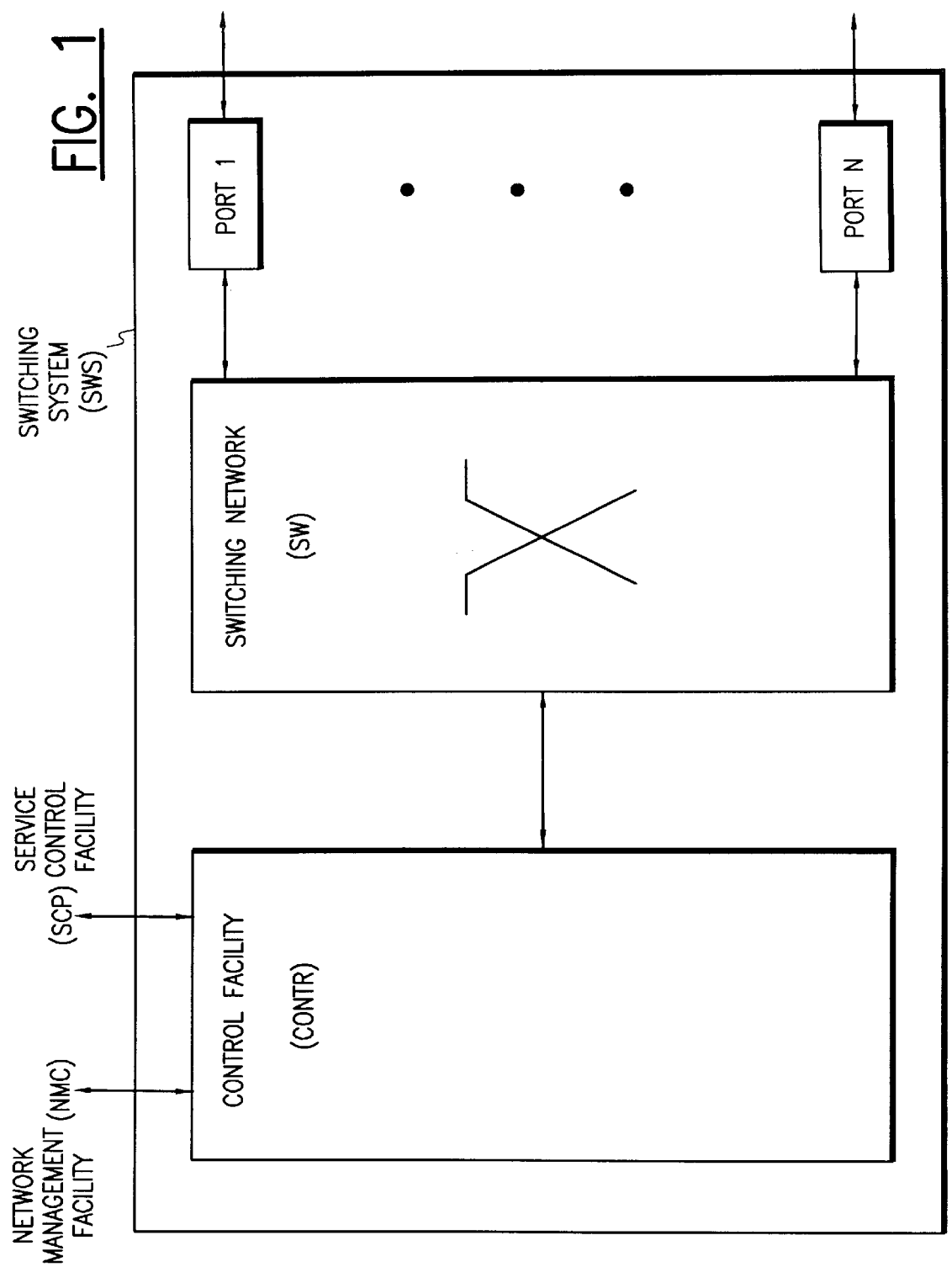
FIG. 1 shows a block diagram of a switching system according to the invention.

FIG. 1 shows a switching system SWS with a control facility CONTR, a coupling or switching network SW and N terminal connections PORT1 to PORTN.

The terminal connections PORT1 to PORTN provide means for connecting subscribers and other switching facilities and exchange data with these and with the switching network SW.

The switching network SW is controlled by the control facility CONTR and switches connections between the terminal connections PORT1 to PORTN and between the control facility CONTR and the terminal connections PORT1 to PORTN.

The control facility CONTR controls all switching-related processes, manages the switching system SWS and provides the necessary functions for tying a network management system and a service management system. For this purpose, it exchanges data with the switching network SW and with a network management facility NMC and a service management facility SCP. In its role as the hardware basis, the control facility CONTR comprises one or more computer systems provided with corresponding peripheral components.

Consequently, the hardware basis of the control facility CONTR comprises either a central computer system which communicates with one or more smaller computer systems, or a plurality of computer systems having equal access and communicating with each other. The communication herein is routed via the switching network SW or via an independent communication system.

Figure 2:
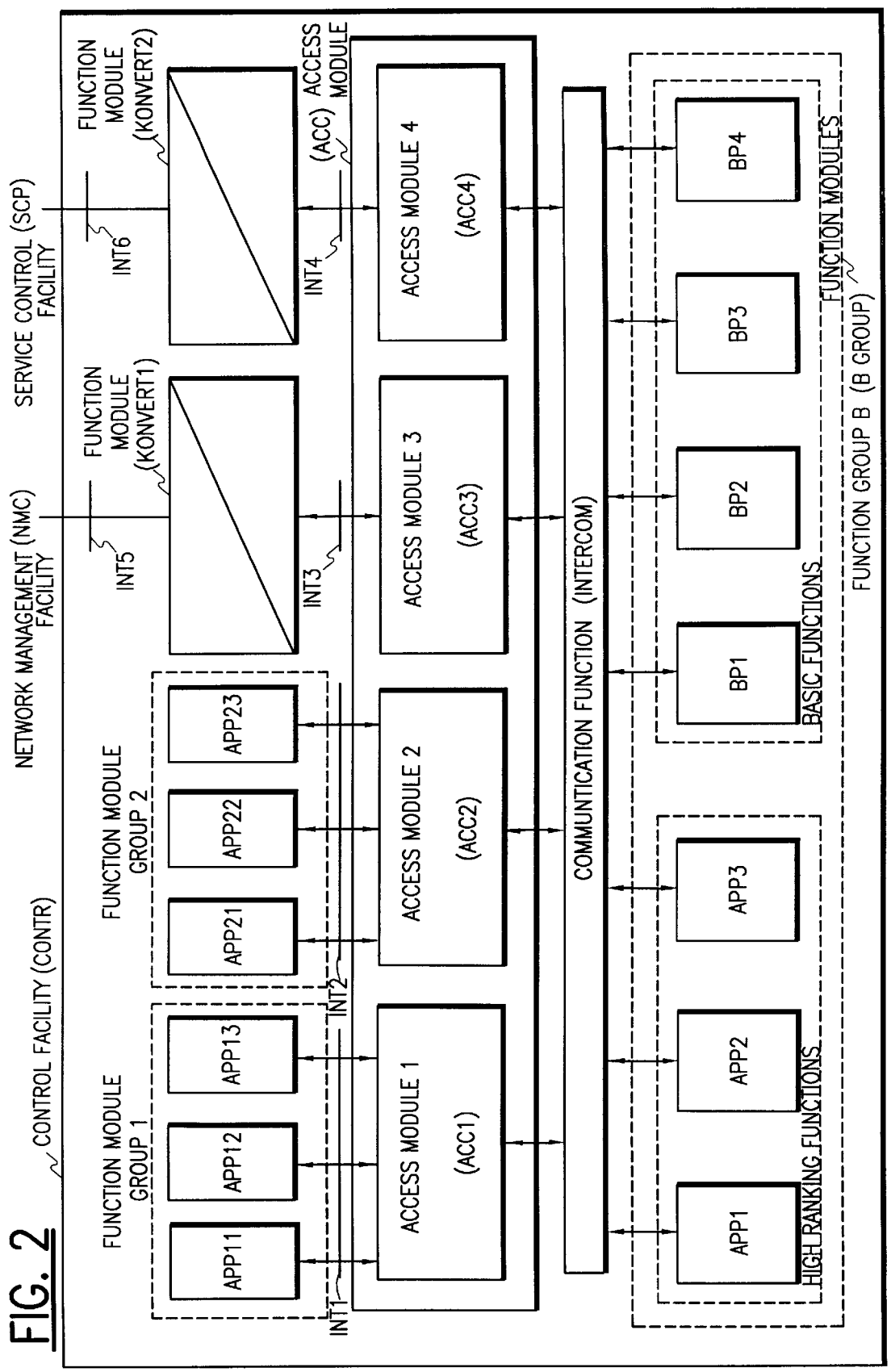
FIG. 2 shows a functional representation of a control facility for the switching system of the invention according to FIG. 1.

FIG. 2 shows the functional design of the control facility CONTR. In this case, the individual functions of the control facility CONTR may also be provided by a variety of computer systems in the control facilities CONTR.

The control facility CONTR comprises seven function modules APP1 to APP3 and BP1 to BP4, a communication function INTERCOM, an access module ACC, and eight additional function modules APP11 to APP23 as well as KONVERT1 and KONVERT2. The function modules APP1 to APP3 and BP1 to BP4 constitute a function group BGROUP. The additional function modules APP11 to APP13 and APP21 to APP23 constitute a function group GROUP1 and GROUP2, respectively. The function modules APP1 to APP3 and BP1 to BP4 and the access module ACC are coupled via the communication function INTERCOM. Each of the additional function modules APP21 to APP23 and KONVERT1 and KONVERT2 communicate with the access module ACC. The additional function modules KONVERT1 and KONVERT2 exchange data with the network management facility NMC and the service control facility SCP, respectively.

The function modules of the function group BGROUP are basic function modules providing all the functions required for operating the switching system. The number of these function modules is only given as an example. The function modules BP1 to BP4 herein provide the basic functions, such as device management or routing management. The function modules APP1 To APP3 provide higher ranking functions, for example subscriber management and traffic recording. Each of the function modules of the function group BGROUP comprises programs and data, whereby the corresponding functions are generated by executing the programs on a computer system of the control facility CONTR. The function modules of the function group BGROUP communicate with each other via the communication function INTERCOM, if essential for the execution of their respective functions. This communication takes place by exchanging messages, by accessing data in another function module or by accessing common data, for example semi-permanent configuration and management data.

The communication function INTERCOM enables the communication between the function modules of the function group BGROUP and between the access module ACC and the function modules. Consequently, the communication function INTERCOM is formed by functions for exchanging messages, for example operating system functions for inter-process communication or by functions of a database system, and provides access to data of the function modules of the function group BGROUP managed by said database system or to common data of the function modules.

The additional function modules of the function groups GROUP1 and GROUP2 also provide higher ranked functions of the switching system. Such functions are, for example, network management functions, functions relating to the provision of services to subscribers of the switching system, or function relating to billing management. The number of function groups GROUP1 and GROUP2 and of the associated additional function modules is chosen as an example only. The additional function modules APP11 to APP23 are formed by programs or by programs and data. In this case, they preferably represent software products of third parties, meaning that it cannot always be expected that the additional function modules comply with the rules established for the function group BGROUP.

For executing their functions, the additional function modules APP11 to APP23 must communicate with each other and with function modules of function group BGROUP. This communication takes place via the access module ACC which provides a logical interface INT1 for the additional function modules of the function group GROUP1 and a logical interface INT2 for the additional function modules APP21 to APP23.

It is also possible that the additional function modules APP11 to APP23 are communicating with each other or within their respective function group, without the communication being routed via the access module ACC.

The additional function modules KONVERT1 and KONVERT2 are responsible for tying the network management facility NMC and the service control facility SCP, respectively. They provide a logical and physical interface INT5 for tying the network management facility NMC and a logical and physical interface INT6 for tying the service control facility SCP, as the case may be. The interfaces INT5 and INT6 are standardized interfaces, for example the Q.3 interface standardized by the ITU-T or the standardized interface for tying service control facilities in the IN-architecture according to the ITU-T standard Q.121x.

The additional function module KONVERT1 processes the protocol stack for the interface INT5 and provides functions for enabling the exchange of commands and data between the function modules of the function group BGROUP and the network management facility NMC. The additional function module KONVERT1 communicates with these function modules and with the other additional function modules via the access module ACC.

Similar remarks apply to the additional function module KONVERT2.

The access module ACC provides the link between the additional function modules APP11 to APP23 and KONVERT1 and KONVERT2 and the function modules APP1 to APP3 and BP1 to BP4. It enables the exchange of messages between the additional function modules and the function modules and access by the additional function modules to data of the function modules. The access module ACC is, on one hand, linked to the function modules APP1 to APP3 and BP1 to BP4 via the communication function INTERCOM, and provides, on the other hand, for each of the additional function modules APP11 to APP23 and KONVERT1 and KONVERT2 one individual logical access interface to these function modules.

The control facility CONTR is constructed in such a way that the additional function modules and the function modules can communicate with each other only via the access module ACC.

The access module ACC comprises four access functions ACC1 to ACC4. The access functions ACC1 to ACC4 are herein assigned to the additional function modules of the function groups GROUP1, GROUP2, the additional function module KONVERT1 and the additional function module KONVERT2, respectively.

Depending on which of the additional function modules is to access one of the function modules of the function group BGROUP, said additional function module will be assigned one of the access functions ACC1 to ACC4 for providing the additional function module with an individual logical access interface, i.e., the interface INT1 or INT2 or INT3 or INT4.

The functions provided by the access functions ACC1 to ACC4 will be discussed hereinafter, taking the access function ACC1 as an example:

The access function ACC1 restricts the access options for the additional function modules APP11 to APP13 to the function modules of the function group BGROUP and creates for these additional function modules an individual representation of the states of these function modules and of the possible access mechanisms.

The function modules of the function group BGROUP are accessed by reading or changing data of these function modules or of common data of these function modules. Consequently, the additional function modules APP11 to APP13 are linked to the function modules of the function group BGROUP via the access function ACC1 for exchange of data. For this purpose, the internal data structure of the function group BGROUP is mapped by the access function ACC1 to an external data structure specific to the function group GROUP1. Consequently, the function modules of the function group BGROUP are accessed in such a way that the additional function modules APP11 to APP13 access the data provided in these modules via the logical interface INT1 in conformance with the external data structure specific to the function group GROUP1.

The specific representation and the specific access options are therefore governed by the choice of this external data structure. The limitation of access options for the additional function modules APP11 to APP13 is achieved by the design of the external data structure: in the external data structure provided via the logical interface INT1 only those data are included which require access by the additional function modules APP11 to APP13. In a data structure so selected, the remaining data of the function group BGROUP remain hidden to the additional function modules APP11 to APP13, thereby preventing them from modifying these data.

Access to the data of the function group BGROUP may also be restricted by setting individual access privileges for the additional function modules APP11 to APP13 in the external data structure provided via the logical interface INT1.

Another possibility for the additional function modules APP11 to APP13 to access the function modules of the function group BGROUP is that these function modules are mapped by the access function ACC1 to an object model specific for the function group GROUP1, that this object model is provided via the logical interface INT1 to the additional function modules APP11 to APP13 which access the function modules of the function group BGROUP by executing operations on the provided object model. Here, too, the access options can be restricted by proper design of this specific external object models or by assigning privileges with respect to the execution of specific operations on this specific external object model.

Another possibility for the additional function modules APP11 to APP13 to access the function modules of the function group BGROUP is to have these modules exchange messages via the access function ACC1, in particular, to have the additional function modules APP11 to APP13 request services of the function modules of the function group BGROUP. Here, too, the message exchange would be individually restricted by the access function ACC1 in that, for example, a message exchange would only be permitted with specific function modules of the function group BGROUP. It is also possible to provide via an interface INT1 an individual virtual function group BGROUP which provides only specific services of the function group BGROUP in an individual form and creates an individual representation of the function group BGROUP.

Access by the additional function modules APP11 to APP23, KONVERT1 and KONVERT2 to the function modules of the function group BGROUP is only possible via the access module ACC. During access, the access module ACC assigns one of the access functions ACC1 to ACC4 to the accessing additional function module, thereby providing it with an individual access interface. The access functions ACC1 to ACC4 are coupled to the function modules of the function group BGROUP via the communication function INTERCOM and consequently have the ability to arbitrarily access the function modules. Among the possible access options, however, the access functions ACC1 to ACC4 provide the additional function modules only with an individually restricted access option via an individual logical access interface.

Figure 3:
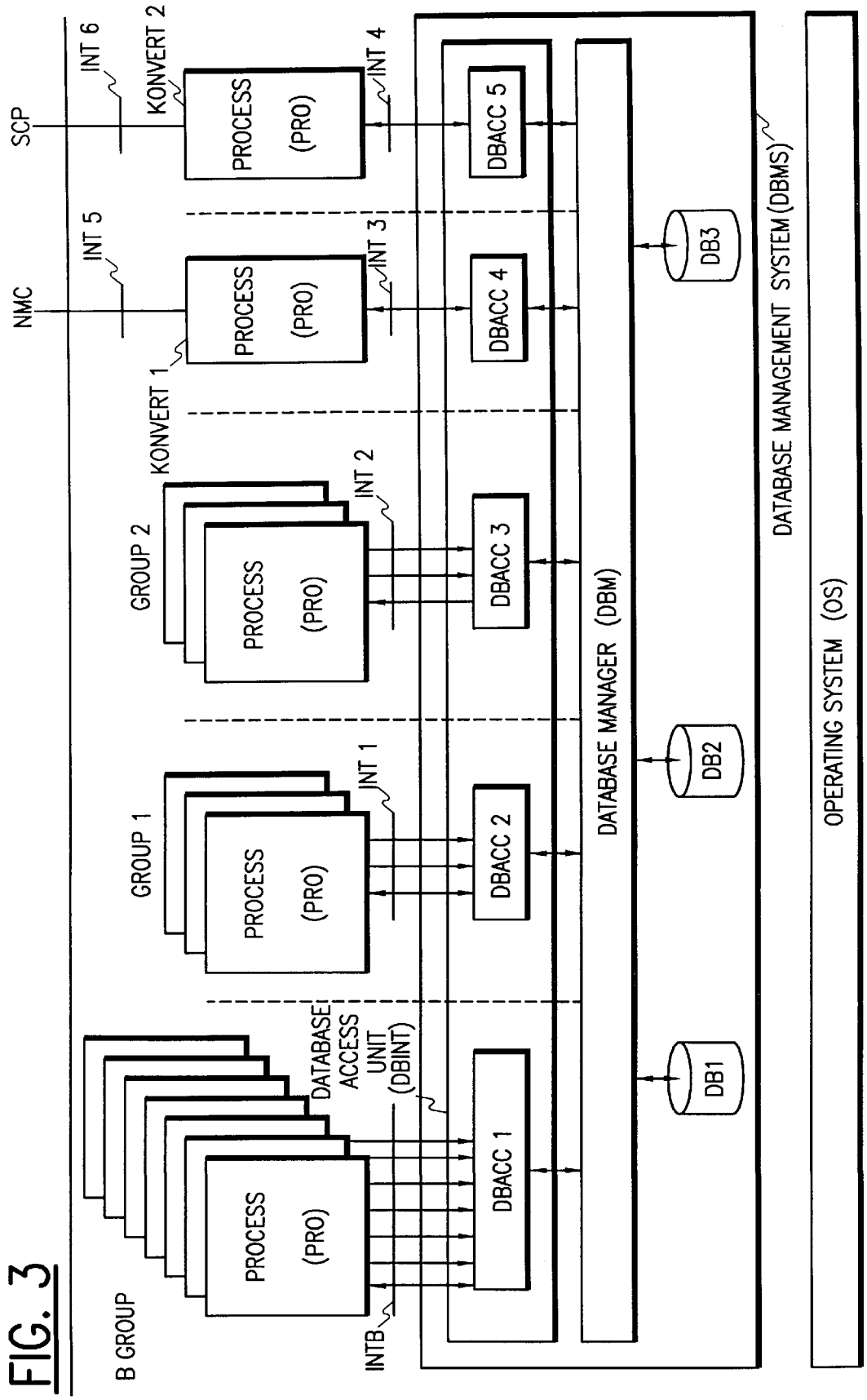
FIG. 3 shows a representation of the software architecture of switching system of the invention according to FIG. 1.

FIG. 3 shows a possible software implementation of the functions of the control facility CONTR of FIG. 2 with the operating system OS, the database DBMS and a plurality of processes PRO.

Each of the processes PRO represents the execution of a program by one of the computer systems of the control facility CONTR. A process of this type, for example, produces the functions of one of the function modules APP1 to APP3 and BP1 to BP4 or of the additional function modules APP11 to APP23, KONVERT1 or KONVERT2. The processes PRO are grouped into five groups:

Processes of the function group BGROUP, i.e., processes representing the execution of functions of the function modules of the function group BGROUP.

Processes of the function group GROUP1, i.e., processes representing the execution of functions of the additional function modules APP11 to APP13.

Processes of the function group GROUP2.

Processes representing the execution of functions of the additional function module KONVERT1.

Processes representing the execution of functions of the additional function module KONVERT2.

The operating system OS manages the processes of the control facility CONTR, especially the processes PRO, and determines the order of execution thereof, starts the processes, determines their status and provides them with standard services which, for example, execute the communication between processes and between processes and devices of the control facility CONTR. In addition, the operating system OS coordinates and synchronizes the access to common operating means, such as computer cores, memory and devices, when several processes are running simultaneously.

The operating system OS may also be a distributed operating system based on several underlying computer systems. The control facility may conceivably also be provided with several independent operating systems.

The database DBMS manages the data of the function modules APP1 to APP3 and BP1 to BP4 and the data common to these function modules. It therefore manages all relevant data which determine and represent the internal operation of the switching system. From a logical point of view, the database DBMS represents one or more specific processes which manage data and, upon request by the processes PRO, manipulate the data or provide these data to the processes PRO.

The database DBMS may possibly be a database distributed over several computer systems. In addition, not all the data of the function modules APP1 to APP3 and BP1 to BP4 may be managed by the database DBMS or data of the additional function modules may also be managed in the database DBMS.

The database DBMS comprises three databases DB1 to DB3, a database manager DBM and a database access unit DBINT.

The databases DB1 to DB3 represent the storage media for physically storing the data managed by the database DBMS. The storage media may be, for example, one or more mass memories of the computer systems of the control facility CONTR, for example hard disk drives.

The database manager DBM performs the actual management functions for the data of the database DBMS stored in the databases DB1 to DB3. The database manager DBM specifies the possible access mechanisms for the data and manages the internal data model which controls access to the data, thereby performing, based on this data model, the actual access operations for accessing the data which are physically stored in the databases DB1 to DB3.

The database access unit DBINT provides the interface between the database DBMS and the processes PRO and hereby especially supports, for example, a database access language by which the processes PRO can access the database DBMS. An example for a database access language of this type is, for example, the database access language SQL (Standard Query Language) or NDL (Network Database Language). However, the database access language may also be a specific proprietary database access language or access protocol.

When one of the processes PRO requests access, the database access unit DBINT determines first which of the additional function modules APP11 to APP23, KONVERT1 and KONVERT2 the corresponding process is associated with. Hereby, the accessing additional function module is specified. It is also possible that the exact identity of the specific additional function module is not specified, but the function group to which it is assigned. The determination is implemented by transmitting an identifier associated with the accessing additional function module in conjunction with a access request or by requesting such identifier from the database access unit DBINT.

Depending on the identified additional function module, the database access unit DBINT provides an individual database access DBACC1 to DBACC5. In this way, the database access DBACC1, DBACC2, DBACC3, DBACC4 and DBACC5, respectively, is provided to the processes of the function group BGROUP, of the function group GROUP1, of the function group GROUP2, of the additional function module KONVERT1 and of the additional function module KONVERT2. The database access DBACC enables access to all data managed by the database DBMS according to the internal data structure. Consequently, the processes PRO of the function group BGROUP are closely coupled according to the internal data structure.

Each of the database accesses DBACC2 to DBACC5 produces the function assigned to the access functions ACC1, ACC2, ACC3 and ACC4, respectively, thereby providing an individually restricted access to the data of the database DBM according to a specific representation.

In the simplest case, it would be possible for the database accesses DBACC2 to DBACC5 to individually restrict access privileges to the data of the database DBM, such that a correspondingly modified data model for accessing the data of the database DBM via the logical interfaces INT1 to INT4 is provided to the additional function modules.

Although the invention has been shown and described with respect to a best mode embodiment thereof, it should be understood by those skilled in the art that the foregoing and various other changes, omissions and additions in the form and detail thereof may be made therein without departing from the spirit and scope of the invention.

We claim:

1. A method of tying additional function modules (APP11 to APP23, KONVERT1, KONVERT2) into a control facility (CONTR) of a switching system (SWS), said control facility comprising a plurality of coupled basic function modules (APP1 to APP3, BP1 to BP4) for controlling switching function of the switching system (SWS), said method comprising the steps of:

(A) coupling basic function modules (APP1 to APP3, BP1 to BP4) with one or more access modules (ACC);
   (B) the additional function modules (APP11 to APP23, KONVERT1, KONVERT2) accessing the basic function modules (APP1 to APP3, BP1 to BP4) via the access modules (ACC) only;
   (C) depending on the respective additional function module (APP11 to APP23, KONVERT1, KONVERT2) that accesses basic function modules (APP1 to APP3, BP1 to BP4), the access modules (ACC) making available to the additional function module a respective logic access interface (INT1 to INT4) to basic function modules (APP1 to APP3, BP1 to BP4) for limiting the access via the respective logic interfaces (INT1 to INT4) on an individual basis; and
   (D) the access modules (ACC) generating an individual representation of internal operations and making said representation available to the additional function modules (AP11 to APP23, KONVERT1, KONVERT2) via the respective logic interface (INT1 to INT4).

2. A method as claimed in claim 1, characterized in that for the access to the basic functions modules (APP1 to APP3, BP1 to BP4), the additional function modules (APP1 to APP23; KONVERT1, KONVERT2) access data of the basic function modules (APP1 to APP3, BP1 to BP4), and that the data is made available to the additional function modules (APP11 to APP23, KONVERT1, KONVERT2) via their respective logic interface in accordance with an individual data structure.

3. A method as claimed in claim 2, characterized in that for logic interfaces, the additional function modules (APP11 to APP23; KONVERT1, KONVERT2) map data according to an internal data structure onto data according to an individual external data structure.

4. A method as claimed in claim 2, characterized in that said limiting the access is carried out by defining individual access rights on the individual data structure.

5. A method as claimed in claim 2, characterized in that said limiting the access is carried out by the design of the individual data structure.

6. A method as claimed in claim 1, characterized in that for the access to the basic function modules (APP1 to APP3, BP1 to BP4), the additional function modules (APP11 to APP23, KONVERT1, KONVERT2) perform operations on an respective object models provided by their respective logic interfaces.

7. A method as claimed in claim 6, characterized in that the access modules (ACC) produce for logic interfaces respective object models from data of the basic function modules (APP1 to APP3, BP1 to BP4).

8. The method according to claim 1, characterized in that a database language is used for communication via a logical interface.

9. A switching system (SWS) with a control facility (CONTR) comprising a plurality of coupled basic function modules (APP1 to APP3, BP1 to BP4) for controlling switching functions of the switching system, characterized in that:

(A) the control facility further comprises additional function modules (APP11 to APP23, KONVERT1, KONVERT2) and one or more access modules (ACC);

(B) the access modules (ACC) are coupled with basic function modules (APP1 to APP3, BP1 to BP4);

(C) the control facility (CONTR) is so designed that the additional basic function modules (APP1 to APP3, BP1 to BP4) access basic function modules (APP11 to APP23, KONVERT1, KONVERT2) via the access modules (ACC) only;

(D) depending on the respective additional basic function module (APP11 to APP23, KONVERT1, KONVERT2) that accesses basic function modules (APP1 to APP3, BP1 to BP4), the access modules (ACC) are designed to make available to the additional function module a respective logic access interface (INT1 to INT4) to basic function modules (APP1 to APP3, BP1 to BP4) for limiting the access via the respective logic interfaces (INT1 to INT4) on an individual basis; and (E) the access modules (ACC) generate an individual representation of internal operations and make said representation available to the additional function modules (APP11 to APP23, KONVERT1, KONVERT2) via the respective logic interface (INT1 to INT4).

10. The switching system according to claim 9, characterized in that the additional function modules (APP1 to APP3, BP1 to BP4) are formed by one or more application programs running on a system platform of the control facility (CONTR).

* * * * *

UNITED STATES PATENT AND TRADEMARK OFFICE
CERTIFICATE OF CORRECTION

PATENT NO. : 5,923,652
DATED : July 13, 1999
INVENTOR(S) : Daase et al

It is certified that error appears in the above-identified patent and that said Letters Patent is hereby corrected as shown below:

At col. 8, line 54, please cancel "AP11" and substitute --APP11-- therefor; and at line 58, please cancel "APP1" and substitute --APP11-- therefor.

Signed and Sealed this

Eighteenth Day of April, 2000

Attest:

Q. TODD DICKINSON

*Attesting Officer*     *Director of Patents and Trademarks*